Feb. 16, 1971 C. B. TRIMBLE ET AL 3,564,521
MINIATURE MAGNETIC HEAD
Filed Dec. 6, 1965 5 Sheets-Sheet 1
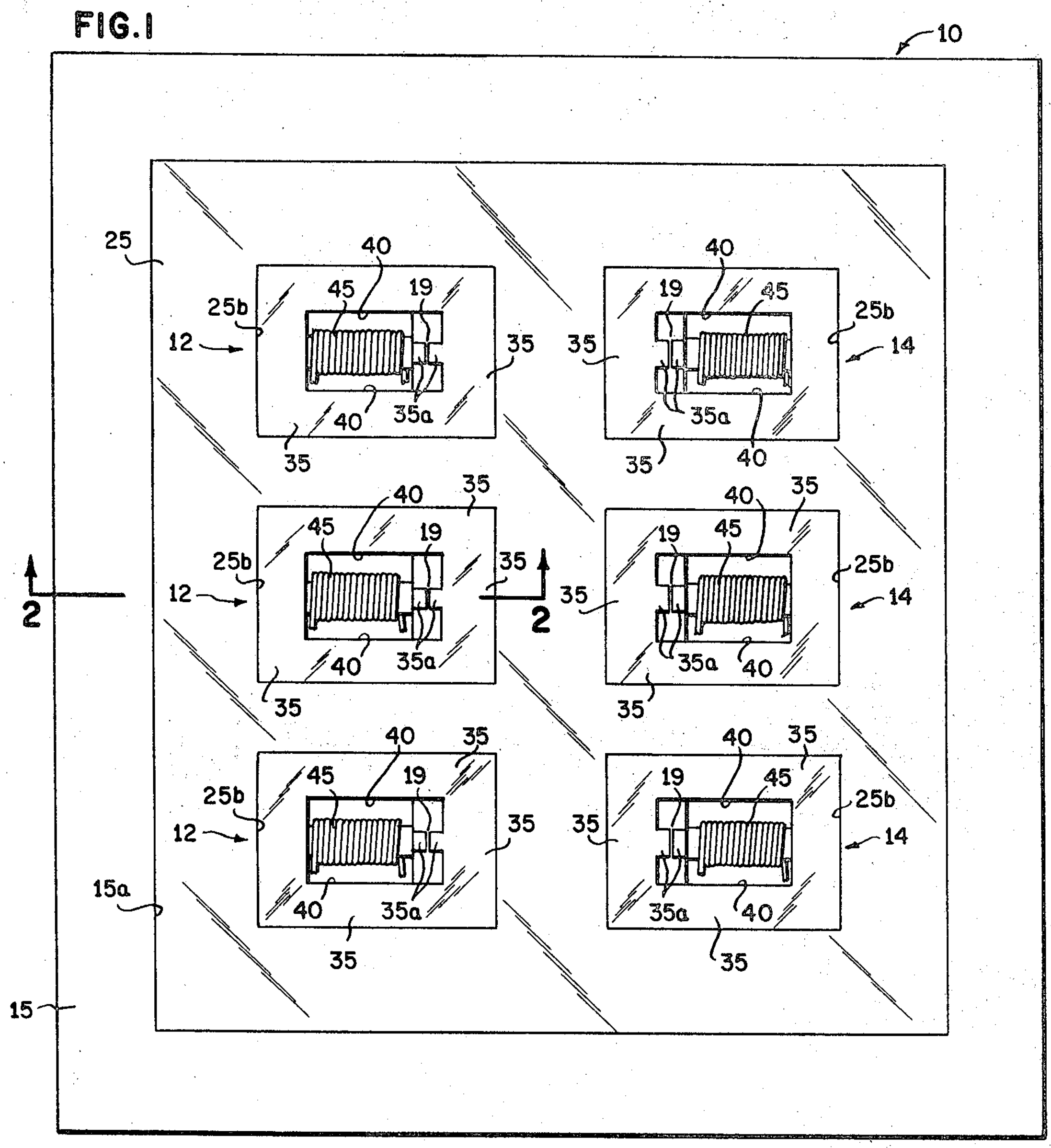
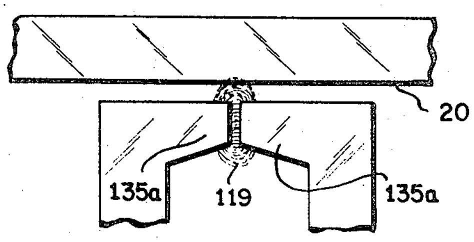
FIG. 3
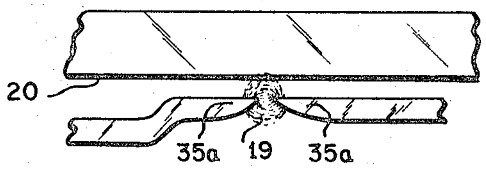
FIG. 4
INVENTORS
CEBERN B. TRIMBLE
ROBERT R. SKUTT
Louis A Kline
BY John J. Mathews
Nathan Cass
THEIR ATTORNEYS

INVENTORS
CEBERN B. TRIMBLE
ROBERT R. SKUTT

Louis A Kline
BY John J. Matlago
Nathan Cass
THEIR ATTORNEYS

Feb. 16, 1971 C. B. TRIMBLE ET AL 3,564,521

MINIATURE MAGNETIC HEAD

Filed Dec. 6, 1965 5 Sheets-Sheet 3

INVENTORS
CEBERN B. TRIMBLE
ROBERT R. SKUTT

BY Louis A. Kline
John J. Matlago
Nathan Cass

THEIR ATTORNEYS

MINIATURE MAGNETIC HEAD

Filed Dec. 6, 1965 5 Sheets-Sheet 4

INVENTORS
CEBERN B. TRIMBLE
ROBERT R. SKUTT

Louis A Kline
BY John J. Matlago
Nathan Cass
THEIR ATTORNEYS

INVENTORS
CEBERN B. TRIMBLE
ROBERT R. SKUTT

Louis A. Kline
BY John J. Matlago
Nathan Cass
THEIR ATTORNEYS

United States Patent Office 3,564,521

Patented Feb. 16, 1971

3,564,521

MINIATURE MAGNETIC HEAD

Cebern B. Trimble, Hawthorne, Calif., and Robert R. Skutt, Dayton, Ohio, assignors to The National Cash Register Company, Dayton, Ohio, a corporation of Maryland Filed Dec. 6, 1965, Ser. No. 511,843

Int. Cl. G11b *5/20, 5/28, 5/42*

U.S. Cl. 340—174.1 5 Claims

ABSTRACT OF THE DISCLOSURE

A miniature magnetic transducer head assembly comprising a non-magnetic substrate provided with recesses having a controlled depth and shaped according, at least, to the shape of the pole pieces of the head. The pole pieces are formed by deposition of magnetic material in the recesses. A thin wall of the substrate which separates the recesses provides the transducing gap between the pole pieces. A magnetic connecting path between the pole pieces is also provided on the substrate to form two parallel outer legs and a center leg. An exciting winding is wound manually around the center leg or can be formed by deposition.

This invention relates generally to magnetic transducer devices, and more particularly to a novel magnetic transducer construction and method of making.

The magnetic transducer art has for many years been plagued by the extreme complexity and cost involved in making magnetic heads, particularly those of the multiple-head type. It will be understood that the construction of such heads presents unusual problems because of the difficulties involved in making and assembling the precisely dimensioned parts required, and these difficulties continue to mount as the art progresses to higher and higher recording densities.

In accordance with the present invention, a novel head construction is provided which not only is simpler and more economical than presently known heads, but also can be made with greater precision and is capable of operation at very high densities.

Accordingly, it is the broad object of this invention to provide improved magnetic head constructions and methods of making same.

A more specific object of this invention is to provide an improved multiple magnetic head construction and method of making whereby greater simplicity and economy as well as precision are achieved.

Another object of this invention is to provide a structurally integrated magnetic head construction which is able to take advantage of thin film fabrication techniques.

Still another object of this invention is to provide a structurally integrated multiple magnetic head unit containing both recording and reproducing portions.

A further object of this invention is to provide a magnetic head having high efficiency.

Yet another object of this invention is to provide a magnetic head capable of operation at very high densities.

A still further object of this invention is to provide improved means and methods for fabricating the exciting winding of a magnetic head.

The specific nature of this invention as well as other objects, advantages and uses thereof will become apparent from the following description and accompanying drawings in which:

FIG. 1 is a plan view of a multiple read-write head unit in accordance with the invention.

FIGS. 3 and 4 are schematic views comparing the pole tips and resulting transducing gap of a conventional head with those of a head in accordance with the invention.

Like numerals designate like elements throughout the figures of the drawings. Thicknesses in cross-sectional views in the drawings are exaggerated for the sake of clarity.

Figure 2:
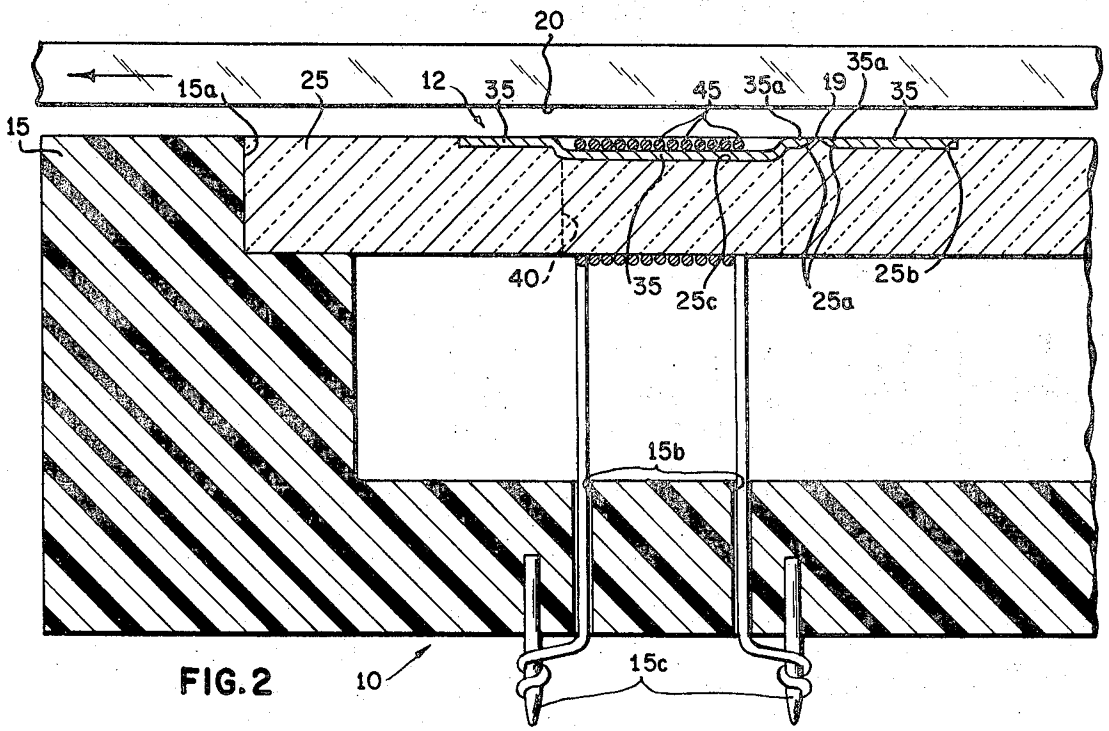
FIG. 2 is a cross-sectional view taken along the line 2—2 in FIG. 1.

Referring initially to FIGS. 1 and 2, illustrated therein is a greatly enlarged exemplary multiple read-write head unit 10 in accordance with the invention. The head unit 10 comprises a supporting member 15 having a recess **15*a* in which is affixed a highly stable substrate 25, such as glass or silicon, having formed thereon a plurality of substantially identical and precisely located magnetic read heads 12, and a plurality of substantially identical and precisely located magnetic write heads 14. The magnetic transducing gaps 19 of the read heads are precisely aligned with one another, and likewise for the magnetic transducing gaps 19 of the write heads 14. Also, the read head gaps 19 are in line with respectively located ones of the write head gaps 19. This is done to permit reading and writing in the same channels with respect to a cooperating recording member 20 (FIG. 2) during relative movement therebetween. Typically each head 12 or 14** may have overall dimensions of 100 mils by 150 mils and each gap may typically be 100 microinches.

Still referring to FIGS. 1 and 2, it will be seen that each magnetic head 12 or 14 is comprised of a thin layer 35 of high permeability magnetic material, such as permalloy or ferrite, disposed in recesses **25*a* (FIG. 2), 25*b* and 25*c* (FIG. 2) in the substrate 25 so as to provide a three-legged magnetic geometry. Recess 25*b* is typically 0.25 mil deep and contains the magnetic layer portions corresponding to the outer legs and connecting magnetic layer portions of each head. Recesses 25*a* (FIG. 2) are separated by a very thin substrate section from which they taper down to a depth of typically 0.25. The magnetic layer portions provided on these recesses 25*a* form the pole tips 35*a* of each head, and the thin unrecessed substrate section 19 therebetween forms the transducing gap of each head. Recess 25*c* (FIG. 2) is typically 3.0 mils deep and contains the magnetic layer portion which together with the pole tips 35*a* correspond to the center leg of each head. As will be noted in FIG. 1, the pole tips 35*a* of each read head 12 are preferably made narrower than the pole tips 35*a* of each write head 14** in order to provide the wide-write narrow-read feature common in conventional heads.

As illustrated in FIGS. 1 and 2, an exciting winding 45 is wound around the center leg using apertures 40 provided in the substrate 25 for this purpose. The term "exciting winding" is used herein to apply to a winding used for either reading or writing, or both. The recess **25*c* is chosen sufficiently deep so that no portion of the exciting winding 45 extends above the surface of the substrate 25. The ends of each winding 45 may typically be fed through holes 15*b* in the supporting member 15** for electrical connection to suitable terminals 15*c* molded therein. For ease of accurate mounting, one or more sides of the supporting member 15 may be precisely finished with respect to the surface of the substrate 25 and/or the aligned gaps 19.

At this point in the description, it may be pointed out that the construction of each head 12 or 14 in FIGS. 1 and 2 as just described results in a head that is not only very much easier and less expensive to make than conventional heads, particularly in microminiature size, but also, is capable of equalling and surpassing the performance of conventionally made heads. One reason why a magnetic head of this construction is able to match and surpass the performance of much more complicated and expensive conventional heads is because the unique geometry and arrangement employed result in a much more efficient use of the magnetic material available than is possible with presently known magnetic head constructions.

For example, it can be seen from FIGS. 1 and 2 that the geometry is advantageous in that the exciting winding 45 in the center leg of each head is very close to its respective transducing gap 19, and the outer legs serve as parallel flux return paths to provide a significantly lower reluctance than a single path. Also, because a head in accordance with the invention can be precisely fabricated in microminiature form, a multiple head unit, such as illustrated in FIGS. 1 and 2 can be provided with a track width equal to and even smaller than is possible in conventional multiple head units, despite the fact that the head is essentially parallel to the plane of the recording surface 20 (FIG. 2).

Another and particularly important advantage of the head of this invention over conventional heads is that the pole tips 35*a* can be made very much thinner than is possible in conventional heads. As a result, in the head of this invention, a greater percentage of the flux in the transducing gap 19 is available for recording on a surface (such as 20 in FIG. 2). This will be evident from FIGS. 3 and 4 in which FIG. 3 illustrates the pole tips 135*a* and recording gap 119 of a conventional head, and FIG. 4 illustrates the pole tips 35*a* and recording gap 19 of a head in accordance with the invention. For best efficiency, the pole tips 35*a* of a head in accordance with the present invention should have a thickness of less than 0.5 mil.

FIGS. 5 to 15 illustrate a preferred method of fabricating the head unit of FIGS. 1 and 2, in accordance with the invention. Although these figures illustrate the method as applied to fabrication of only a single read head 12, this is done merely for the sake of simplicity, and it is to be understood that all of the read and write heads 12 and 14 in FIG. 1 may be fabricated at the same time in the manner described for the single head shown.

Figure 5:
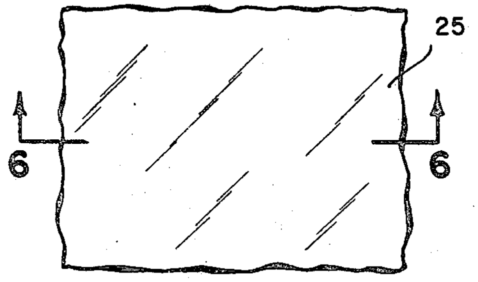
FIGS. 5 to 15 are plan and cross-sectional views illustrating steps in the fabrication of the multiple read-write head unit of FIGS. 1 and 2 in accordance with the invention.
Figure 6:
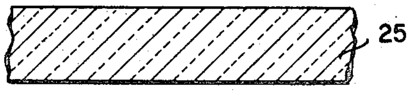

In FIGS. 5 and 6, the basic glass substrate 25 is shown prior to treatment.

Figure 7:
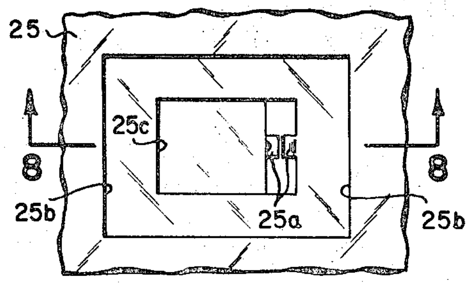
Figure 8:
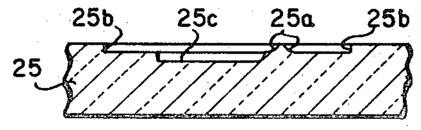

The first step, as illustrated in FIGS. 7 and 8, is to etch the substrate 25 so as to form the recesses 25*a* 25*b* and 25*c* which are to contain the magnetic layer portions of each head. For best accuracy, it has been found preferable to perform the etching in successive steps, particularly in providing the pole tips recesses 25*a* which are the most critical. Such etching may be performed using masking techniques familiar to those in the integrated circuit art, in which case each etching may be performed on all of the read and write heads at the same time.

Figure 9:
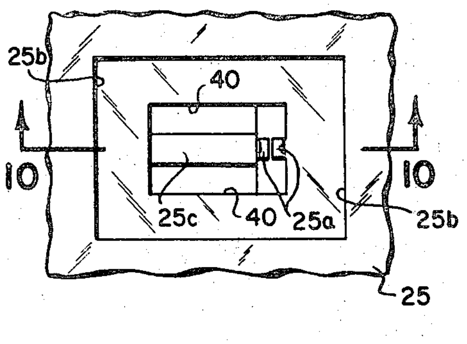
Figure 10:
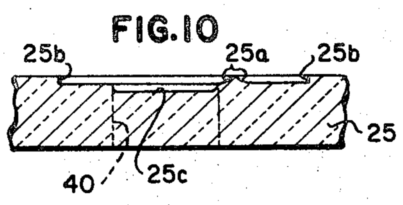

As illustrated in FIGS. 9 and 10, the apertures 40 are next provided. These apertures 40 pass from the deeper recess 25*c* completely through the substrate 25, and may be provided by drilling, etching, or ultrasonic machining.

Figure 11:
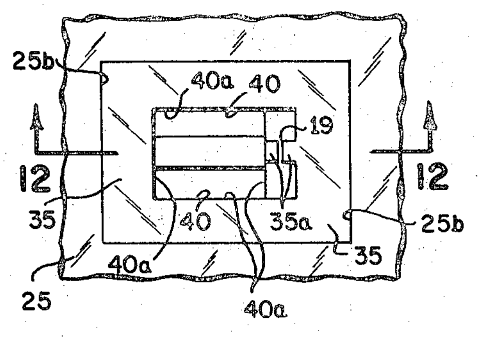
Figure 12:
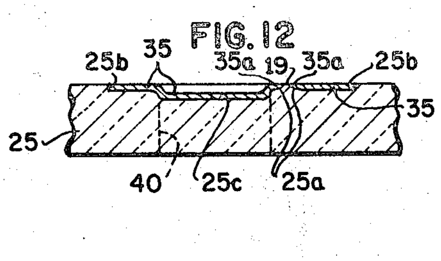

The next step, as illustrated in FIGS. 11 and 12, is to provide the high permeability magnetic layer 35. This is preferably accomplished by electroplating, in which case a suitable conductive coating such as SnO is first applied. An alternative method is to provide the magnetic material in a form suitable for spraying and then, in one or more cycles, spraying the entire substrate 25, including the recesses, with a thin magnetic layer 35. A third method is to provide the magnetic material in the form of a finely ground powder which is mixed with an appropriate vehicle to form a slurry and then applied over the exposed surfaces of the glass substrate 25 in the desired thickness. After using any of the three methods just described, the magnetic material will be present over the upper surface of the substrate 25 and in all of the recesses 25*a*, 25*b* and 25*c*. It is then necessary to remove the magnetic material from unwanted areas, such as by lapping or etching, or a combination of both. Lapping is a particularly desirable way of precisely forming the pole tips 35*a* and gap 19 of each head, since it is merely necessary that the substrate surface be lapped until the original substrate surface is exposed and the desired gap 19 obtained for each head. Other portions of unwanted magnetic material, which cannot be removed by lapping, such as on the outer sides 40*a* of apertures 40, may be removed by etching. The resultant magnetic layer 35 after removal of all unwanted magnetic material is shown in FIGS. 11 and 12. It will be understood that, because the pole tips are provided with tapering, the width of the transducing gap 19 may be accurately controlled by the amount of lapping performed after the original substrate surface is exposed, the greater the lapping, the wider the gap 19.

Figure 13:
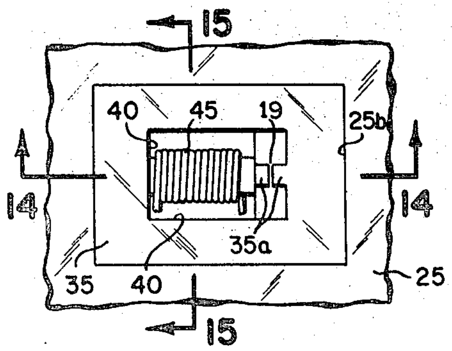
Figure 14:
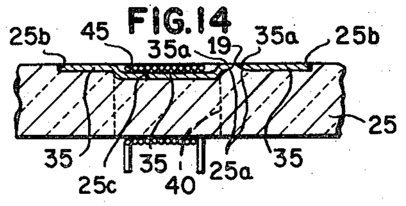
Figure 15:
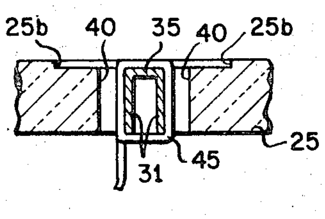
Figure 18:
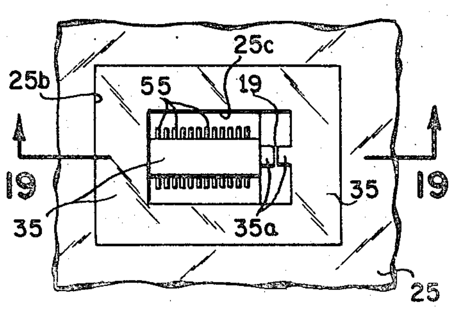

After the magnetic layer 35 has been provided, typically with a thickness of the order of 0.25 mil, and normally less than 2 mils, the next operation is to thread an insulated exciting winding 45 around the middle leg of each head using the respective apertures 40, as shown in FIGS. 13 to 15. As will be noted at 31 in FIG. 15 (which is an end view taken along the line 15—15 of FIG. 13), the magnetic layer is preferably deposited along the sides of the center leg as well as on the top, whereby a higher permeability and tighter coupling between the exciting winding and the magnetic material are obtained. Although only relatively few turns are shown for the exciting winding 45, it will be understood that many more turns may be provided, 40 turns being typical.

The final step is to mount the substrate 25 containing the read-write heads 12 and 14 to a suitable supporting member 15, as shown in FIG. 2, and to electrically connect the windings 45 to respective terminals 15*c*.

Figure 16:
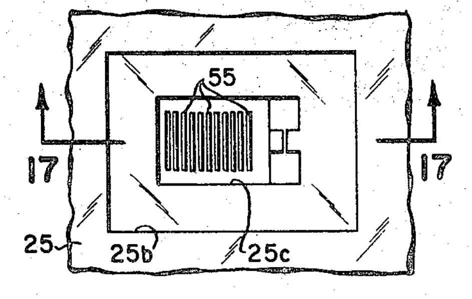
FIGS. 16 to 21 are plan and cross-sectional views illustrating steps in the fabrication of a modified multiple read-write head in accordance with the invention.
Figure 17:
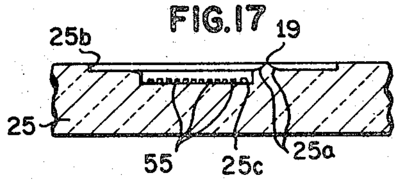

FIGS. 16 to 21 illustrate steps in the fabrication of a modified version of a multiple read-write head in which the exciting winding of each head is deposited, instead of being threaded as in FIGS. 1 and 2. The initial etching of the recesses 25*a*, 25*b* and 25*c* in the fabrication of such a modified head unit may be the same as described in connection with FIGS. 5 to 8. Once such etching has been acomplished, the next step is to deposit the lower portion of the exciting winding which is comprised of spaced conductive strips 55, as illustrated in FIGS. 16 and 17. This deposition may be accomplished for each head by first uniformly coating the entire area of each recess with a conductive layer, and then etching away the unwanted areas. For example, the conductive layer may be coated with a photo-resist, exposed through a mask corresponding to the strips 55, and then etched leaving the conductive strips 55.

The next step is to deposit the magnetic layer 35 which may be accomplished as previously described in connection with FIGS. 11 and 12. If a ferrite is used as the magnetic material, there is no need to insulate the strips 55 because of the relatively high resistivity of ferrites. However, if permalloy is used as the magnetic material, insulation is necessary, which may conveniently be provided by using aluminum for the conductive strips 55, and then anodizing the aluminum to provide an insulative coating thereon. It will be understood that since the apertures 40 (FIGS. 1 and 2) are not provided in this modified head, an additional step is required for the purpose of properly shaping the center leg, such as by etching, so as to separate it from the outer legs and expose the end portions of the lower conductive strips 55. The result is then shown in FIGS. 18 and 19.

Figure 20:
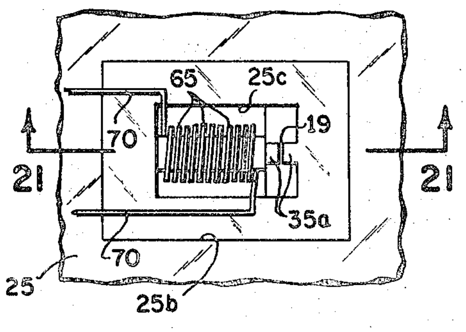
Figure 19:
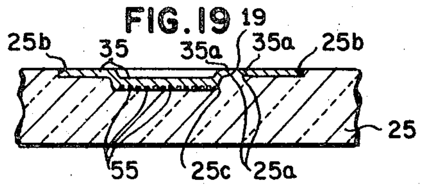
Figure 21:
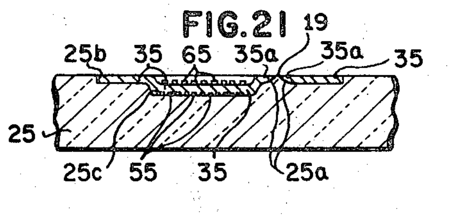
Figure 22:
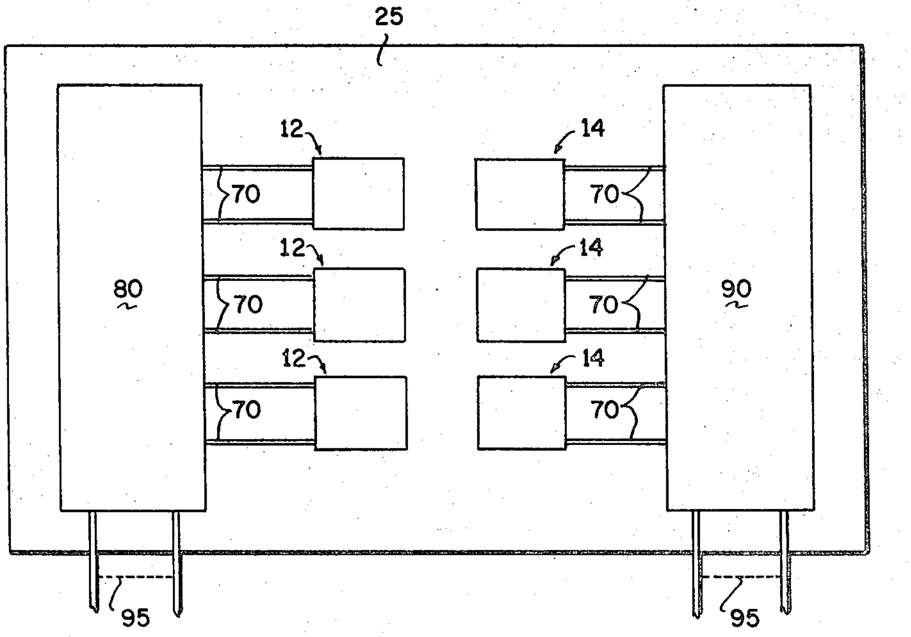
FIG. 22 is a schematic diagram illustrating how a multiple read-write head in accordance with the invention may be connected to other integrated and/or thin film circuitry.

The final step, as shown in FIGS. 20 and 21, is to deposit the upper portion of the exciting winding comprising diagonal strips 65 so as to form a continuous coil. If permalloy is used as the magnetic material, an insulative coating is first provided, such as by sputtering a thin layer of glass on the center leg portion of the magnetic layer which will contact the upper strips 65. Instead of depositing the upper strips 65, gold wires compression-bonded to the lower strips 55 may be used for this purpose. At this time, it is advantageous to also provide a connecting lead 70 (FIG. 20), such as by deposition, from each respective end of each exciting winding for connection to other electronic circuits which may be integrated or printed on the substrate 25 along with the read and write heads forming the multiple head unit. For example, FIG. 22 illustrates a substrate 25 containing not only the read and write heads 12 and 14 fabricated in the manner described herein, but also containing the associated read and write electronics 80 and 90 provided using presently known integrated circuit and/or film techniques. Such a composite structure may have input terminals 95 so as to permit it to be connected with other circuits.

Figure 23:
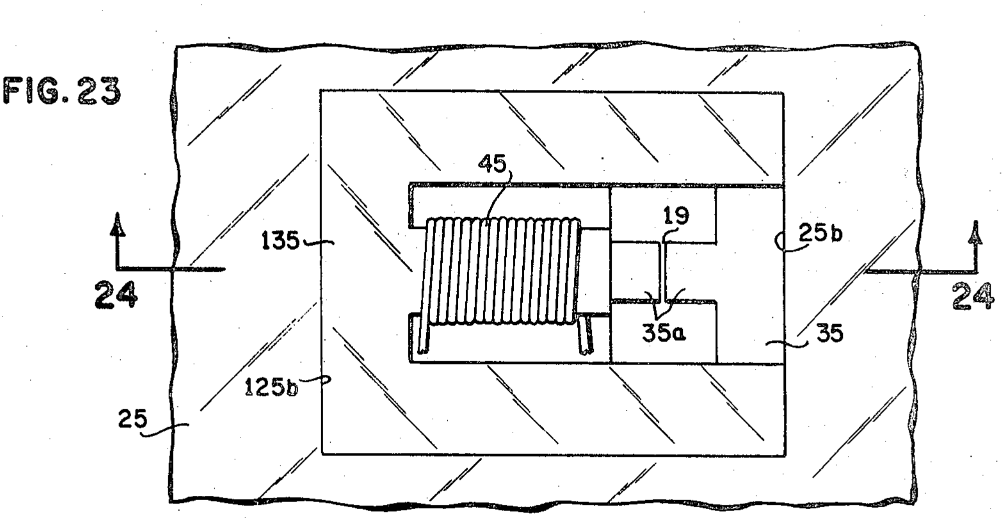
FIGS. 23 to 25 are plan and cross-sectional views illustrating a modified embodiment of a head in accordance with the invention.
Figure 24:
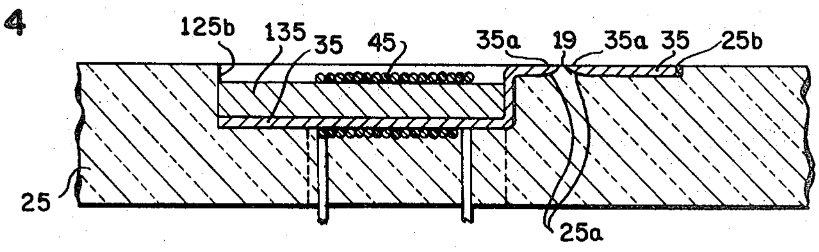
Figure 25:
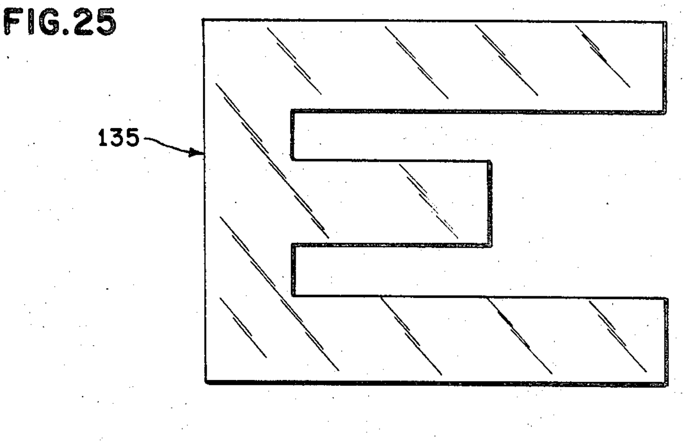

FIGS. 23 to 25 illustrate another modification of a head in accordance with the invention in which an E-shaped thin strip 135 (FIG. 25) of typically 1 mil thick and high permeability material, such as permalloy, is disposed over corresponding portions of the magnetic layer 35, prior to providing the exciting winding 45, for the purpose of increasing the effective permeability of the head. It will be noted from FIGS. 23 and 24 that this E-shaped magnetic strip 135 is accommodated simply by providing a recess **125*b* deep enough to accommodate the strip and winding 45. It will be understood that the fabrication of such a head may proceed as previously described in connection with FIGS. 5 to 15, except that the deeper recess 125*b* is substituted for recess 25*c* and for those portions of recess 25*b* which are to be covered by the E strip 135. The magnetic layer 35 may be deposited as previously described and the pole tips 35*a* and gap 19 precisely formed by lapping as before. Then, prior to winding the exciting winding 45, the E strip is secured to corresponding portions of the magnetic layer 35**, such as by epoxy.

It will also be understood, that instead of covering the particular portions illustrated in FIGS. 23 and 24 with a permalloy strip, additional portions of the magnetic layer 35 could be covered (except for the critical area of the pole tips **35*a*), or just the center leg, depending upon the permeability desired and the use to which the head is to be applied. In any event, even when permalloy strips are added, the provision of the magnetic layer 35 and pole tips 35*a* is still highly advantageous not only to permit the pole tips 35*a* to be precisely formed as previously described herein, but also, to provide for good coupling between the pole tips 35*a*** and the magnetic paths.

It is to be understood in connection with this invention that the embodiments and methods disclosed herein are only exemplary, and that various modifications in construction and arrangement may be made without departing from the spirit of the invention. The invention, therefore, is to be considered as including all variations and modifications coming within the scope of the invention as defined in the appended claims.

What is claimed is:

1. A magnetic head comprising: a non-magnetic substrate, magnetic material deposited on said substrate to form a closed magnetic path having a transducing gap with pole tips on opposite sides of said gap, said magnetic path forming a three-legged magnetic geometry with the pole tips and transducing gap in the center leg, said substrate having spaced recesses in which a portion of said magnetic material is deposited to form said pole tips and at least a portion of the center leg, said pole tips and at least the substrate surface in the immediate vicinity thereof finished in a common surface, apertures provided in said substrate between the center leg and each leg of said three-legged geometry, and an exciting winding wound around the center leg through said apertures, the depth of the center leg recesses being such that the exciting winding is below said common surface.

2. A magnetic head comprising: a non-magnetic substrate, said substrate having accurately formed spaced recesses on the surface thereof, magnetic material providing a closed magnetic path having a transducing gap with pole tips on opposite sides of said gap, said magnetic path and said pole tips formed by deposition of said magnetic material in the accurately formed recesses provided on the surface of said substrate, and an exciting winding coupled to said magnetic path, wherein said magnetic path forms a three-legged magnetic geometry with the pole tips and transducing gap in the center leg.

3. The invention in accordance wtih claim 2 wherein first and second pluralities of said magnetic heads are formed on the same singular planar unit of said substrate, said first and second pluralities of heads being located so that the first plurality of heads have their gaps all in a single line and the second plurality of heads have their gaps all in a single line parallel to the line of said first plurality so that the transducing gap of each head of said first plurality is in line with a respective head of said second plurality.

4. The invention in accordance with claim 2 wherein a plurality of said magnetic heads are formed on said substrate spaced from one another and located so that their transducing gaps are all in a single line, wherein each magnetic path is formed with a three-legged magnetic geometry with said pole tips and transducing gap in the center leg, and wherein said exciting winding is coupled to said center leg.

5. The invention in accordance with claim 2, wherein said exciting winding comprises a first plurality of spaced conductive strips deposited below the center leg of said three-legged magnetic geometry and a second plurality of spaced conductive strips is deposited over the magnetic material forming the center leg, the first and second pluralities of spaced strips being constructed and arranged so as to form a continuous coil.

References Cited

UNITED STATES PATENTS

| | | | |
|---|---|---|---|
| 2,928,907 | 3/1960 | Lubkin | 179—100.2 |
| 3,171,903 | 3/1965 | Wheeler et al. | 179—100.2 |
| 3,240,881 | 3/1966 | Oliver | 179—100.2 |
| 3,344,237 | 9/1967 | Gregg | 179—100.2 |
| 3,303,292 | 2/1967 | Bedell, Jr. et al. | 340—174.1 |
| 3,287,713 | 11/1966 | Porter | 179—100.2 |
| 3,214,645 | 10/1965 | Gabor | 29—603 |
| 3,140,361 | 7/1964 | Eldridge | 340—174.1 |
| 3,225,145 | 12/1965 | Warren | 340—174.1 |
| 3,323,116 | 5/1967 | Solyst | 346—74 |
| 3,341,667 | 9/1967 | Brown et al. | 340—174.1 |
| 3,409,884 | 11/1968 | Goertly | 340—174.1 |
| 3,414,893 | 12/1968 | Coccagna | 340—174.1 |

BERNARD KONICK, Primary Examiner

V. P. CANNEY, Assistant Examiner

U.S. Cl. X.R.

29—603; 179—100.2